United States Patent

Matsumoto et al.

[11] Patent Number: 6,038,373
[45] Date of Patent: *Mar. 14, 2000

[54] IMAGE PROCESSING SYSTEM AND METHOD AND RECORDING MEDIA

[75] Inventors: Hisashi Matsumoto, Kawasaki; Makoto Katsuma, Kawaguchi; Akio Iino, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/864,730

[22] Filed: May 28, 1997

[30] Foreign Application Priority Data

May 31, 1996 [JP] Japan ................................ 8-138165
May 31, 1996 [JP] Japan ................................ 8-138166

[51] Int. Cl.[7] .............................. B41B 15/00; G06K 9/00; H04N 7/18; G03F 3/08
[52] U.S. Cl. ........................ 395/109; 395/109; 395/114; 358/529; 382/112; 382/275; 348/125
[58] Field of Search ............................ 358/529; 395/109, 395/114; 382/112, 275; 348/125

[56] References Cited

U.S. PATENT DOCUMENTS

| | | | |
|---|---|---|---|
| 3,555,262 | 1/1971 | Shimada et al. | 258/529 |
| 4,745,466 | 5/1988 | Yoshida et al. | 358/80 |
| 4,933,983 | 6/1990 | Hiramatsu et al. | 382/8 |
| 4,974,068 | 11/1990 | Hiramatsu et al. | 358/75 |
| 5,353,132 | 10/1994 | Katsuma | 358/539 |

FOREIGN PATENT DOCUMENTS

| | | | |
|---|---|---|---|
| 0 571 926 A1 | 1/1993 | European Pat. Off. | H04N 1/46 |
| 0 571 926 | 12/1993 | European Pat. Off. | H04N 1/46 |
| 0 735 743 | 10/1996 | European Pat. Off. | H04N 1/54 |
| 7193723 | 7/1995 | Japan . | |
| 9051421 | 2/1997 | Japan . | |
| 95/33331 | 12/1995 | WIPO | H04N 1/60 |

*Primary Examiner*—Edward L. Coles
*Assistant Examiner*—Twyler Lamb
*Attorney, Agent, or Firm*—Fitzpatrick, Cella, Harper & Scinto

[57] ABSTRACT

An image processing system is constructed of an input device for inputting color image data which does not include color components corresponding to specific colors' a storing media for storing a table for making the color image data which does not include the color components corresponding to the specific colors correspond to output image data constructed of color components corresponding to the plurality of recording materials including the specific colors' and a developing unit for developing the input color image data into output image data constructed of the color components corresponding to the plurality of recording materials including the specific colors by using the table. The developing unit executes the developing process by using an interpolating process according to the kinds of color components corresponding to the recording materials. A precision of a color reproduction by a plurality of coloring materials including specific colors is raised by performing an interpolating process according to the color components.

9 Claims, 13 Drawing Sheets

FIG. 4

| C | M | Y | | C' | M' | Y' |
|---|---|---|---|---|---|---|
| 0 | 0 | 0 | → | -20 | 0 | -5 |
| 0 | 0 | 51 | → | -10 | 0 | 40 |
| 0 | 0 | 102 | → | -5 | 0 | 100 |
| 0 | 0 | 153 | → | 0 | 0 | 140 |
| 0 | 0 | 204 | → | 0 | 10 | 200 |
| 0 | 0 | 255 | → | 0 | 20 | 255 |
| 0 | 51 | 0 | → | 2 | 40 | 0 |
| : | : | : | : | : | : | : |
| 255 | 255 | 255 | → | 255 | 300 | 400 |

FIG. 5

| C" | M" | Y" | | C_out | M_out | Y_out | K_out | B_out | O_out |
|---|---|---|---|---|---|---|---|---|---|
| 0 | 0 | 0 | → | 0 | 0 | 0 | 0 | 0 | 0 |
| 0 | 0 | 51 | → | 0 | 0 | 40 | 0 | 0 | 0 |
| 0 | 0 | 102 | → | 0 | 0 | 100 | 0 | 0 | 0 |
| 0 | 0 | 153 | → | 0 | 0 | 140 | 0 | 0 | 0 |
| 0 | 0 | 204 | → | 0 | 10 | 200 | 0 | 0 | 0 |
| 0 | 0 | 255 | → | 0 | 20 | 255 | 0 | 0 | 0 |
| 0 | 51 | 0 | → | 2 | 40 | 0 | 0 | 0 | 0 |
| 0 | 51 | 51 | → | 0 | 10 | 0 | 0 | 0 | 35 |
| 0 | 51 | 102 | → | 0 | 20 | 60 | 0 | 0 | 40 |
| 0 | 51 | 153 | → | 0 | 25 | 100 | 0 | 0 | 50 |
| : | : | : | : | : | : | : | : | : | : |
| 255 | 255 | 255 | → | 0 | 0 | 180 | 255 | 180 | 0 |

| CX | MX | YX |   | C' | M' | Y' |
|----|----|----|---|-----|-----|-----|
| C0 | M0 | Y0 | → | cc0 | mm0 | yy0 |
| C1 | M1 | Y1 | → | cc1 | mm1 | yy1 |
| C2 | M2 | Y2 | → | cc2 | mm2 | yy2 |
| C3 | M3 | Y3 | → | cc3 | mm3 | yy3 |
| C4 | M4 | Y4 | → | cc4 | mm4 | yy4 |
| C5 | M5 | Y5 | → | cc5 | mm5 | yy5 |
| C6 | M6 | Y6 | → | cc6 | mm6 | yy6 |
| C7 | M7 | Y7 | → | cc7 | mm7 | yy7 |

| C" | M" | Y" |  | C_out | M_out | Y_out | K_out | B_out | O_out |
|---|---|---|---|---|---|---|---|---|---|
| C" 0 | M" 0 | Y" 0 | → | cc_0 | mm_0 | yy_0 | kk_0 | bb_0 | oo_0 |
| C" 1 | M" 1 | Y" 1 | → | cc_1 | mm_1 | yy_1 | kk_1 | bb_1 | oo_1 |
| C" 2 | M" 2 | Y" 2 | → | cc_2 | mm_2 | yy_2 | kk_2 | bb_2 | oo_2 |
| C" 3 | M" 3 | Y" 3 | → | cc_3 | mm_3 | yy_3 | kk_3 | bb_3 | oo_3 |
| C" 4 | M" 4 | Y" 4 | → | cc_4 | mm_4 | yy_4 | kk_4 | bb_4 | oo_4 |
| C" 5 | M" 5 | Y" 5 | → | cc_5 | mm_5 | yy_5 | kk_5 | bb_5 | oo_5 |
| C" 6 | M" 6 | Y" 6 | → | cc_6 | mm_6 | yy_6 | kk_6 | bb_6 | oo_6 |
| C" 7 | M" 7 | Y" 7 | → | cc_7 | mm_7 | yy_7 | kk_7 | bb_7 | oo_7 |

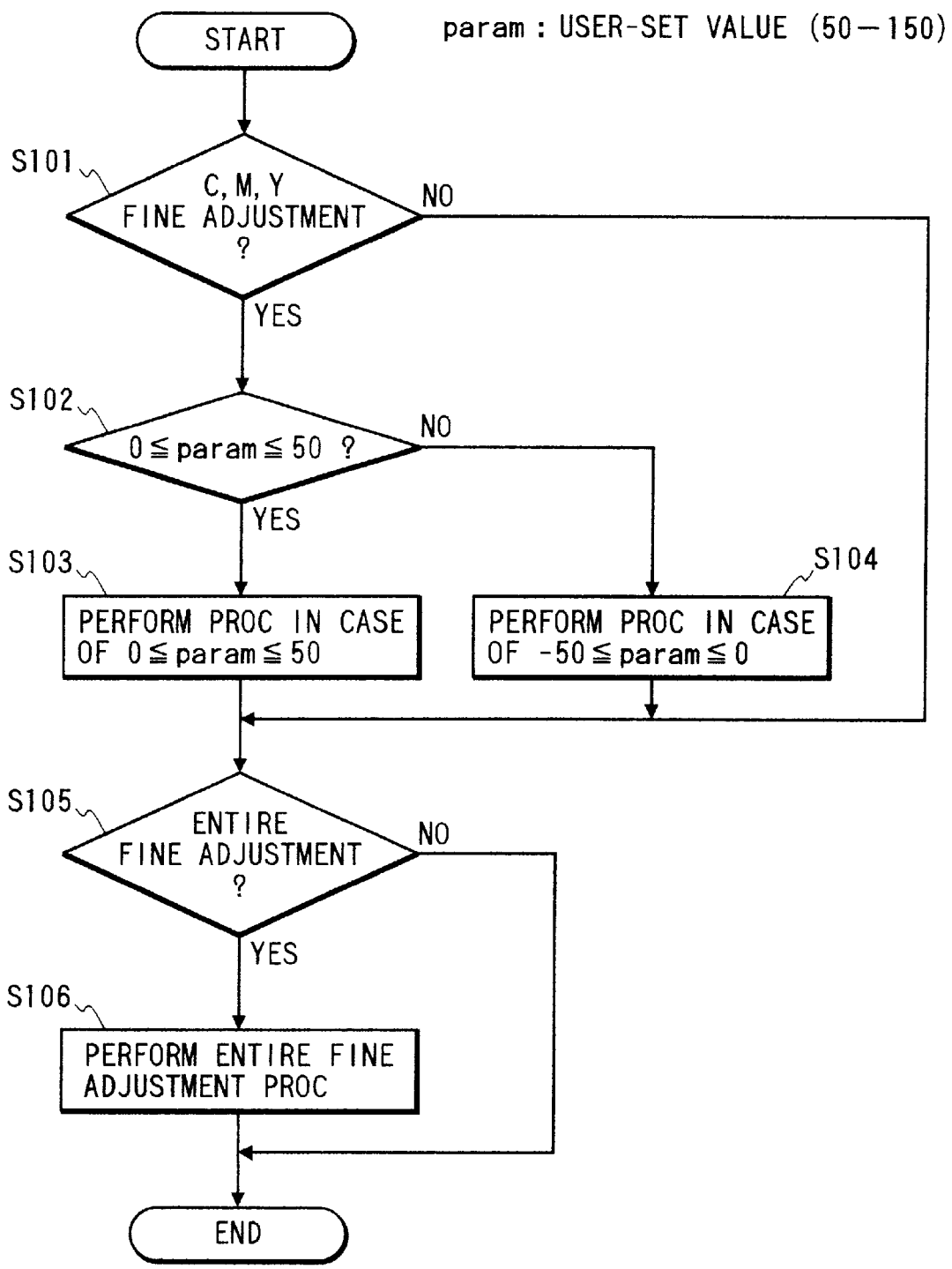

IMAGE PROCESSING SYSTEM AND METHOD AND RECORDING MEDIA

BACKGROUND OF THE INVENTION

1. Field of the Invention

The invention relates to an image processing system for converting inputted color image data into color image data according to a plurality of coloring materials including specific colors.

2. Related Background Art

Hitherto, when input image data of RGB is developed into ink colors, as a method of performing a color correction in accordance with color reproducing characteristics of an input/output apparatus, it is a general method whereby a masking process is performed by using an arithmetic operating process and a correction of γ characteristics is performed by using a lookup table.

However, in a system for forming an image by using coloring materials having specific colors of O (orange), B (blue), and the like other than the colors of CMYK, the conventional method has problems such that in order to perform a high accurate color reproduction, a construction of the system becomes complicated and costs rise.

Hitherto, in case of developing image data of RGB into ink colors and printing by a printer, when the user finely adjusts an ink density, the RGB data of an original image is converted into predetermined ink colors and ink densities are finely adjusted on the basis of an instruction of the user for the converted ink colors.

Hitherto, however, since the fine adjustment of the ink densities has been performed for the ink colors on the basis of the instruction of the user, for instance, when there are total five ink colors of C (cyan), M (magenta), Y (yellow), B (blue), and O (orange), unless the user has advanced knowledge, it is difficult to set adjustment amounts for five colors, respectively, and it is impossible to perform an adjustment to obtain a desired output color.

SUMMARY OF THE INVENTION

The invention is made in consideration of the foregoing drawbacks and it is an object of the first invention to raise a precision of a color reproduction by a plurality of coloring materials including specific colors by performing an interpolating process according to color components.

To accomplish the above object, there is provided an image processing system comprising: input means for inputting color image data which does not include color components corresponding to specific colors; storing means for storing a table for making the color image data which does not include the color components corresponding to the specific colors correspond to output image data constructed of color components corresponding to the plurality of recording materials including the specific colors; and developing means for developing the input color image data into output image data constructed of the color components corresponding to the plurality of recording materials including the specific colors by using the table, wherein the developing means executes the developing process by using an interpolating process according to the kinds of color components corresponding to the recording materials.

It is an object of the second invention to raise a precision of a color reproduction by showing standard density data by real numbers.

To accomplish the above object, there is provided an image processing system comprising: input means for inputting color image data depending on input media; first color correcting means for performing a color correction corresponding to the input media to the color image data depending on the input media and outputting standard density data shown by real numbers which does not depend on the input media and output media; and second color correcting means for performing a color correction corresponding to the output media to the standard density data shown by the real numbers and outputting density data corresponding to each of colors of recording materials shown by integers.

It is an object of the third invention to enable the user to easily perform an adjustment to obtain a desired output color even if he does not have advanced knowledge in an image processing system for developing into output image data constructed of color components corresponding to a plurality of recording materials including specific colors.

To accomplish the above object, there is provided an image processing system for developing color density data which does not include color components corresponding to specific colors into output image data constructed of color components corresponding to a plurality of recording materials including the specific colors, comprising: adjusting means for performing an independent adjustment to each of color components of the color density data or a similar adjusting process to each of the color components on the basis of a manual instruction of the user; and developing means for developing the adjusted color density data into color component data corresponding to a plurality of recording materials including the specific colors.

The above and other objects and features of the present invention will become apparent from the following detailed description and the appended claims with reference to the accompanying drawings.

BRIEF DESCRIPTION OF THE DRAWINGS

FIG. 4 is an explanatory diagram of an input media matrix table;

FIG. 5 is an explanatory diagram of an output media matrix table;

FIG. 17 is a diagram of a picture plane for the user to visually perform a fine adjustment;

FIG. 21 is a processing flowchart for a fine adjustment set in the user.

DETAILED DESCRIPTION OF THE PREFERRED EMBODIMENTS

Embodiment 1

Figure 1:
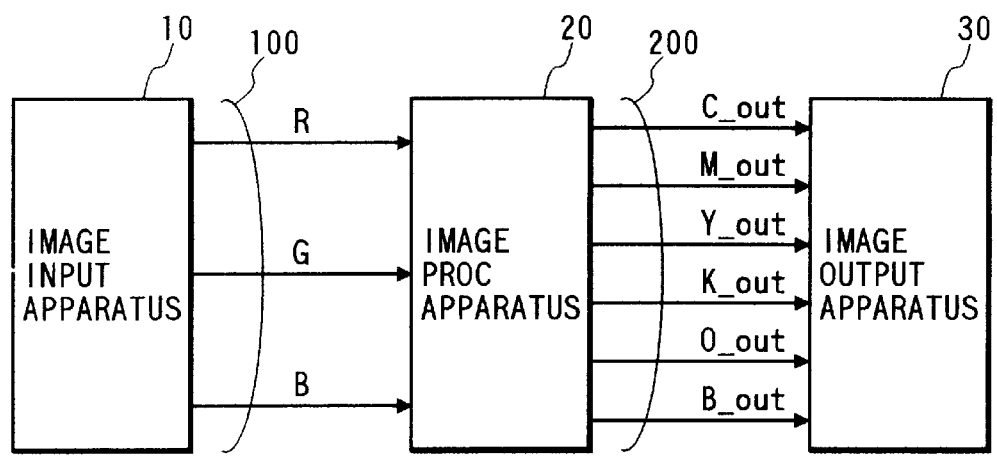
FIG. 1 is a block diagram showing an outline of an image processing system according to an embodiment.

FIG. 1 is a block diagram showing an example of a system of an embodiment according to the invention.

Figure 2:
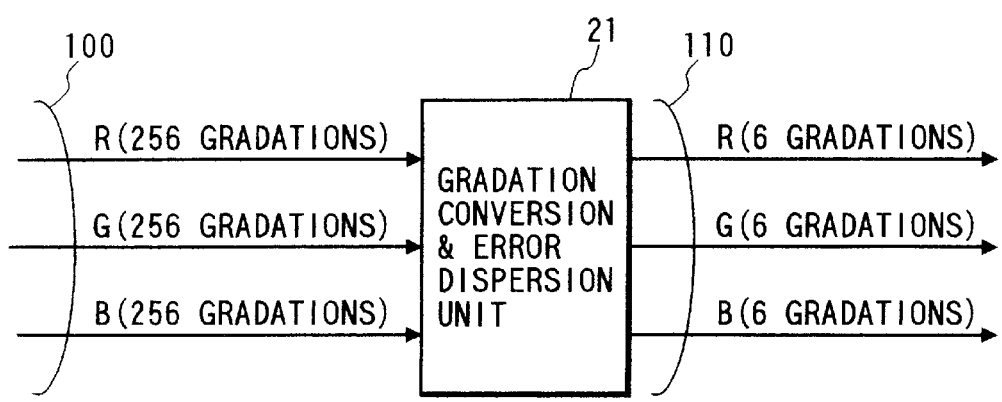
FIG. 2 is a block diagram of a gradation conversion & error dispersion unit in the image processing system shown in FIG. 1.

Reference numeral 10 denotes a color image input apparatus; 20 an image processing apparatus; and 30 an image output apparatus. As a color image input apparatus 10, a scanner for generating image data by exposing and scanning an original image, a host computer for forming an arbitrary image (computer graphics (CG)) on the basis of a display picture plane by using application software, or the like is considered. The image output apparatus according to the embodiment forms an image onto a recording medium such as a woven fabric or the like by using a recording head of a type such that a film boiling is caused in a plurality of inks including specific color inks (O and B) by a heat energy and liquid droplets are emitted. As recording media, there can be mentioned various materials such as cloth silk (cotton and silk), thread which is used for an embroidery, wallpaper, paper, film for OHP, plate-like material such as alumite or the like, and other various materials to which predetermined liquid crystals can be applied by using an ink jet technique. The cloth silk includes all of woven textiles, unwoven textiles, and other cloth materials irrespective of a raw material, a manner of weaving, and a manner of knitting. Image data 100 of R, G, and B each having 256 gradations is sent from the image input apparatus 10 to the image processing apparatus 20. In FIG. 2, the RGB image data inputted to a gradation conversion & error dispersion unit 21 is gradation converted and RGB image data 110 in which an error occurring upon conversion is processed by an error dispersion method is formed.

Figure 3:
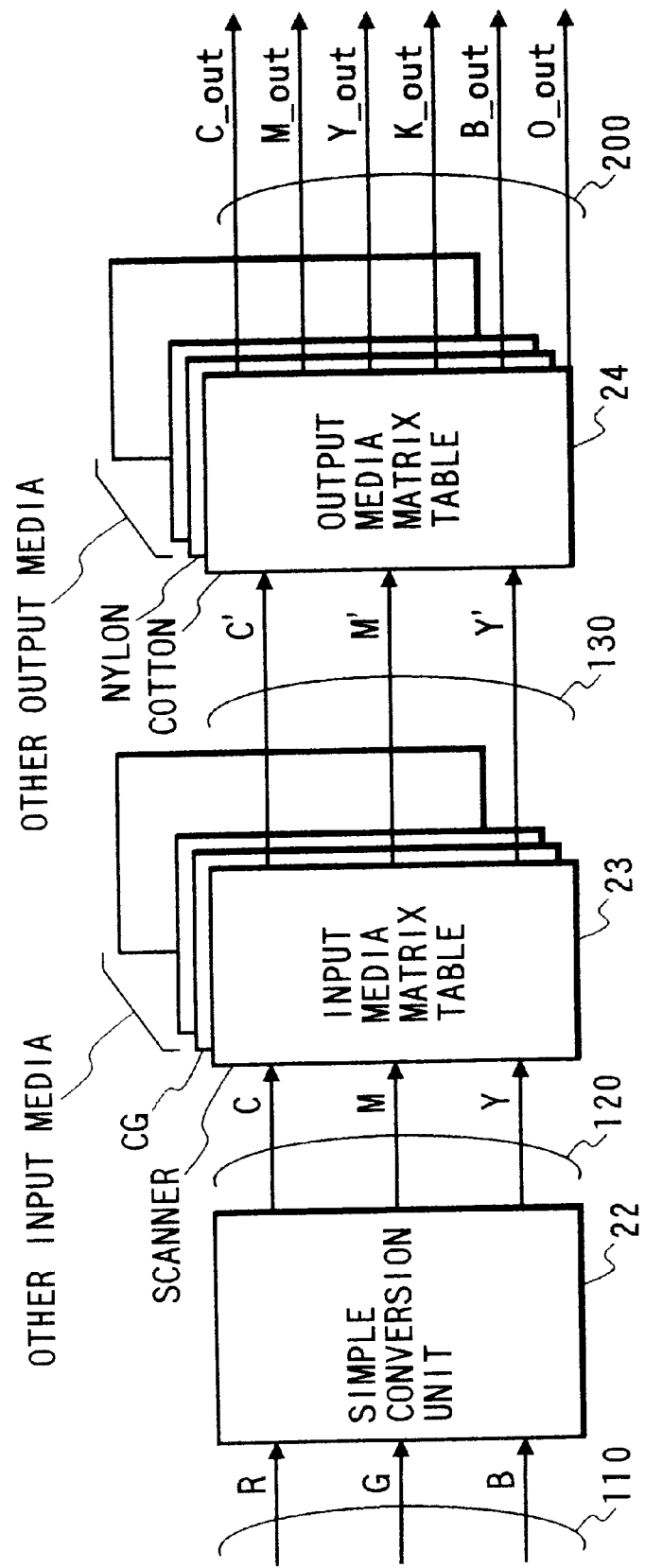
FIG. 3 is a block diagram of an image processing unit (RGB→ink colors)

FIG. 3 shows an internal structure of a portion to process an ink color development from the RGB data.

The gradation converted RGB data 110 is inputted to a simple conversion unit 22 and converted into CMY data 120, respectively.

In the simple conversion unit 22, values of the RGB data 110 are simply inverted and values of the CMY data 120 are obtained as follows.

$$C=255-R, M=255-G, Y=255-B$$

The CMY density data (hereinafter, referred to as CMY data) 120 which was simply converted is collated with data in an input media matrix table 23, thereby calculating virtual CMY density data (C'M'Y' data) 130.

The matrix table 23 is a lookup table in which values of the C'M'Y' data corresponding to representative values of the CMY data which is inputted (FIG. 4).

In the embodiment, virtual CMY density data in which the RGB data that is inputted is converted by using a 3-dimensional matrix table corresponding to input media is shown by using real numbers and can be set to a value of 0 or less or 255 or more.

In the embodiment, as a virtual density, the density is standardized to a Macbeth density. By standardizing to the Macbeth density as mentioned above, a correction based on input characteristics corresponding to the input media and a correction based on output characteristics corresponding to the output media can be separately performed. Further, by showing the standardized C'M'Y' data (virtual density data) by real numbers, the conversion error can be minimized.

Since the input media matrix table differs depending on the input media, a plurality of input media matrix tables corresponding to the input media are prepared. A table corresponding to the input media is automatically set by a CPU (not shown).

Each value of the C'M'Y' data 120 is shown by real numbers.

By performing the color correction to the CMY image data by using the lookup table corresponding to the input media, a distortion which the CMY image data 120 has and which is based on the input media can be properly corrected.

Figure 6:
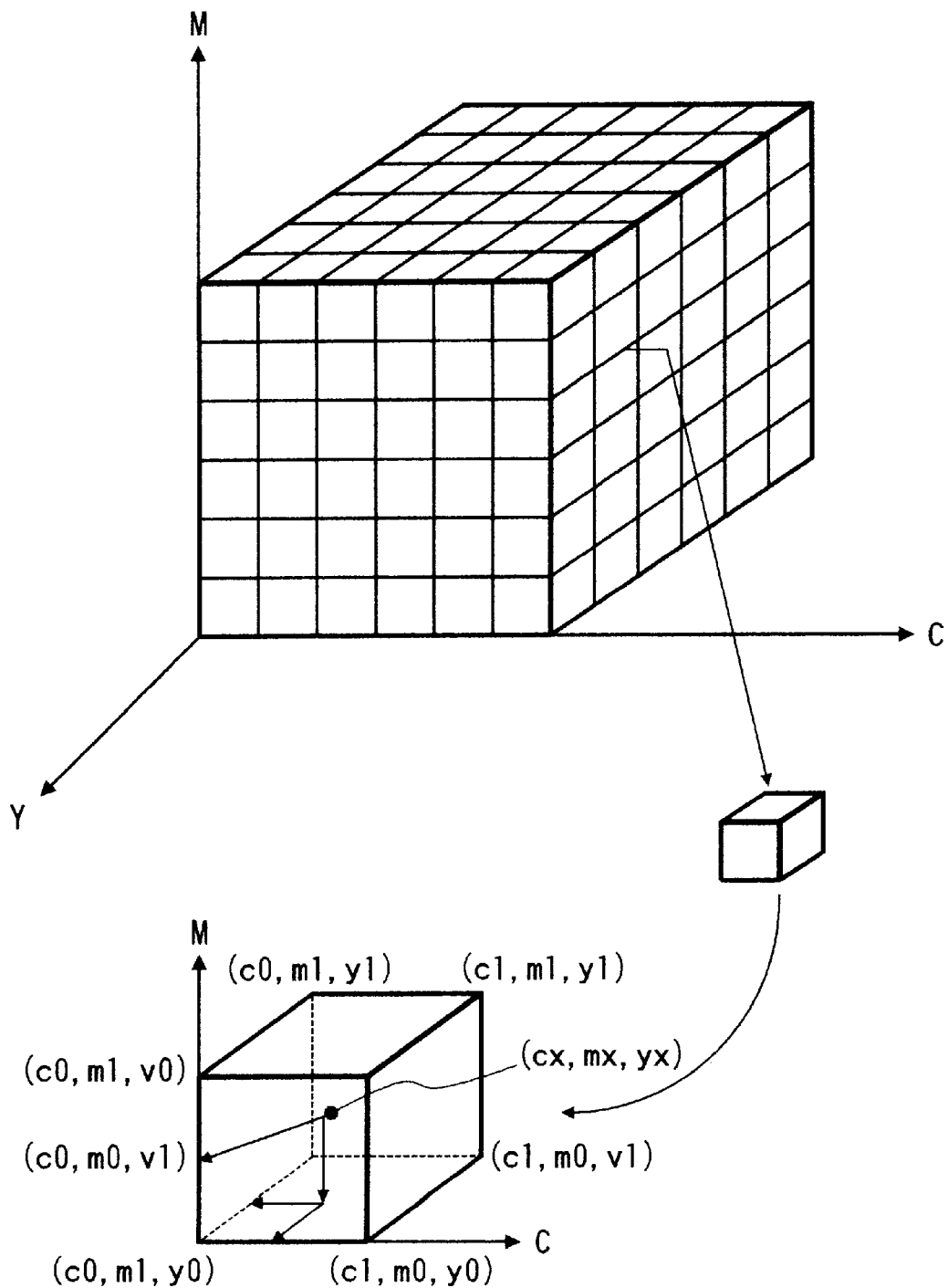
FIG. 6 is an explanatory diagram showing relations among a CMY cube which was quantized and eight points near an inputted value.

As shown in FIG. 6, the C'M'Y' data corresponding to each CMY data inputted belongs to a CMY cube. The representative value of the data that is inputted in the matrix table is stored at each lattice point of the cube at the upper stage in FIG. 6. When the CMY data is inputted by values other than the representative values on the table, the C'M'Y' data 130 is obtained by predicting from the ink color data of the representative values at eight points surrounding the input CMY data.

The converted C'M'Y' data shown by the real numbers is collated with an output media matrix table 24, thereby calculating ink color data (CMYKBO) shown by integers. C denotes cyan, M magenta, Y yellow, K black, B blue, and O orange (B and O are specific colors).

On the basis of a fact that the characteristics of the output media matrix table are different every output media, a plurality of output media matrix tables are previously stored in correspondence with output media such as nylon, cloth, and the like. The corresponding table is automatically set to the output media by the CPU (not shown).

A method of obtaining each color of the virtual CMY density data (C', M', Y') 130 will now be described in detail hereinbelow.

Method of Obtaining C'

Figure 7:
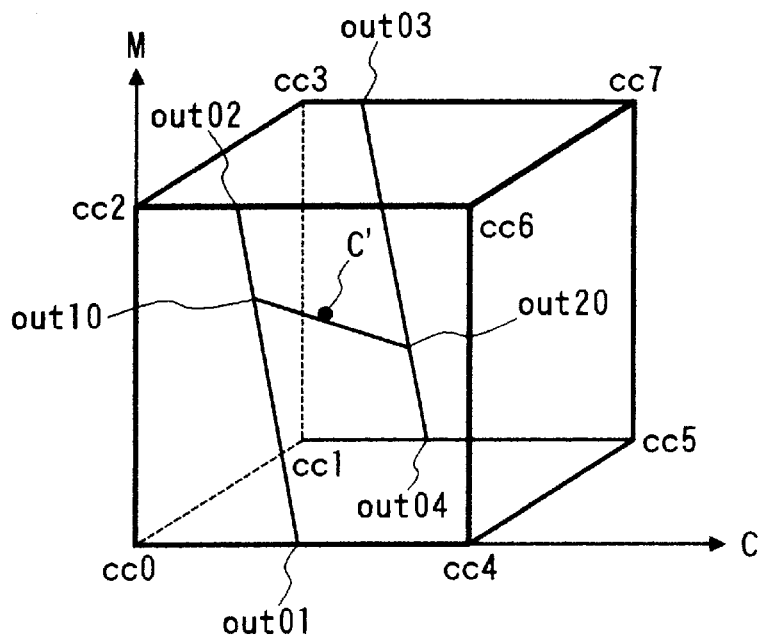
FIG. 7 is an explanatory diagram of an input media matrix table showing a cube to obtain a value of C data of virtual CMY data and eight points near the inputted value.

In FIG. 7, values are obtained on the basis of a presumption such that they have linear characteristics in the cube.

Now, assuming that the input values are set to R, G, and B, they are simply converted into CMY as follows.

$$CX=255-R, MX=255-G, YX=255-B$$

C' is obtained by CX, MX, and YX and the representative values at eight points near the input media matrix table.

Calculations on a C axis:

out01=(CX−C0)*(cc4−cc0)/(C4−C0)+cc0 (if C4=C0, cc0)
out02=(CX−C2)*(cc6−cc2)/(C6−C2)+cc2 (if C6=C2, cc2)
out03=(CX−C2)*(cc7−cc3)/(C7−C3)+cc3 (if C7=C3, cc3)
out04=(CX−C1)*(cc5−cc1)/(C5−C1)+cc1 (if C5=C1, cc1)

Figure 8:
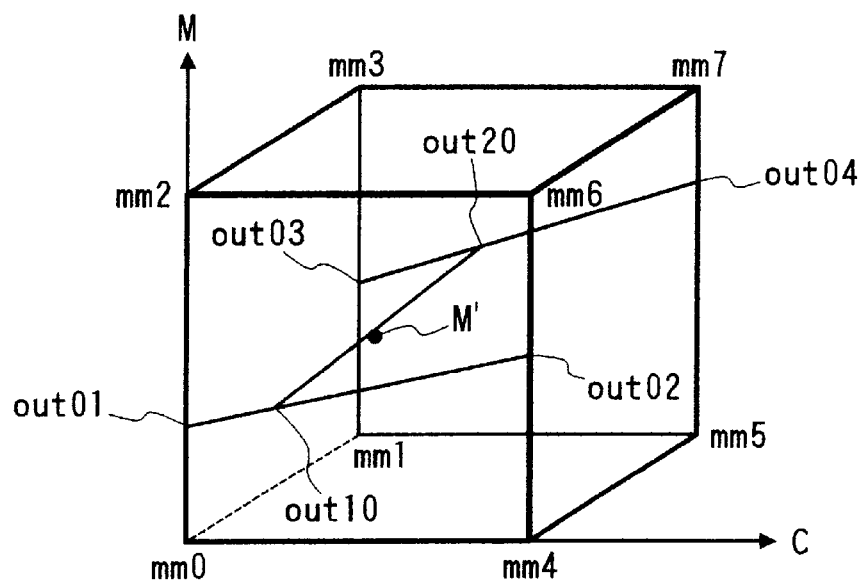
FIG. 8 is an explanatory diagram of a cube for obtaining a value of M data of the virtual CMY data.

Calculations on an M axis:
out10=(MX−M0)*(out02−out01)/(M2−M0)+out01 (if M2=M0, out01)
out20=(MX−M1)*(out04−out03)/(M3−M1)+out03 (if M3=M3, out03)
Calculation on a Y axis:
C'=(YX−Y0)*(out20−out10)/(Y1−Y0)+out10 (if Y1=Y0, out01)
Method of obtaining M'
In FIG. 8, values are obtained on the basis of a presumption such that they have linear characteristics in the cube.
Now, assuming that the input values are set to R, G, and B, they are simply converted into CMY as follows.

CX=255−R, MX=255−G, YX=255−B

Figure 9:
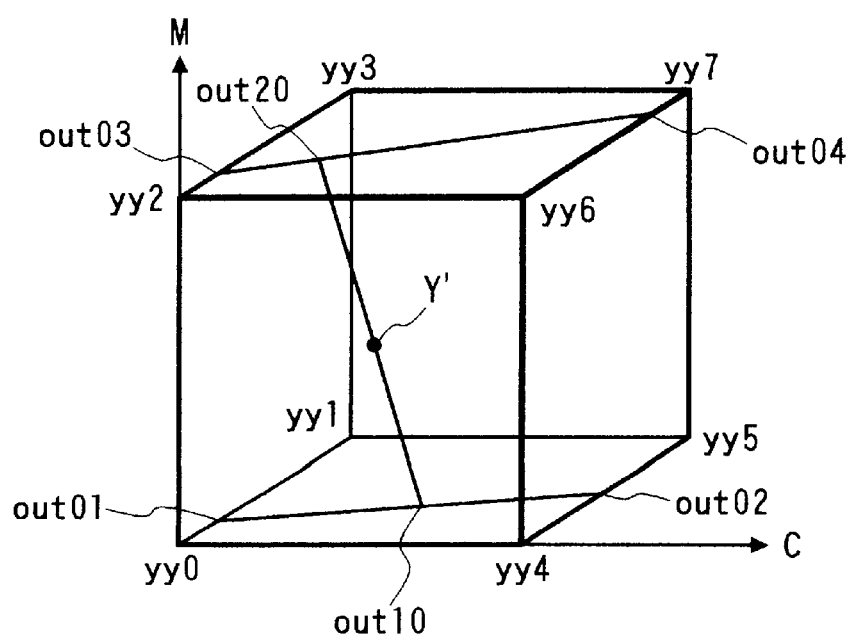
FIG. 9 is an explanatory diagram of a cube to obtain a value of Y data of the virtual CMY data.

M' is obtained by CX, MX, and YX and the representative values at eight points near the input media matrix table.
Calculations on the M axis:
out01=(MX−M0)*(mm2−mm0)/(M2−M0)+mm0 (if M2=M0, mm0)
out02=(MX−M4)*(mm6−mm4)/(M6−M4)+mm4 (if M6=M4, mm4)
out03=(MX−M1)*(mm3−mm1)/(M3−M1)+mm1 (if M3=M1, mm1)
out04=(MX−M5)*(mm7−mm5)/(M7−M5)+mm5 (if M7=M5, mm5)
Calculations on the C axis:
out10=(CX−C0)*(out02−out01)/(C4−C0)+out01 (if C4=C0, out01)
out20=(CX−C1)*(out04−out03)/(C5−C1)+out03 (if C5=C1, out03)
Calculation on the Y axis:
M'=(YX−Y0)*(out20−out10)/(Y1−Y0)+out10 (if Y1=Y0, out10)
Method of obtaining Y'
In FIG. 9, values are obtained on the basis of a presumption such that they have linear characteristics in the cube.
Now, assuming that the input values are set to R. G, and B, they are simply converted into CMY as follows.

CX=255−R, MX=255−G, YX=255−B

Y' is obtained by CX, MX, and YX and the representative values at eight points near the input media matrix table.
Calculations on the Y axis:
out01=(YX−Y0)*(yy1−yy0)/(Y1−Y0)+yy0 (if Y1=Y0, yy0)
out02=(YX−Y4)*(yy5−yy4)/(Y5−Y4)+yy4 (if Y5=Y4, yy4)
out03=(YX−Y2)*(yy3−yy2)/(Y3−Y2)+yy2 (if Y3=Y2, yy2)
out04=(YX−Y6)*(yy7−yy6)/(Y7−Y6)+yy6 (if Y7=Y6, yy6)
Calculations on the C axis:
out10=(CX−C0)*(out02−out01)/(C4−C0)+out01 (if C4=C0, out01)
out20=(CX−C2)*(out04−out03)/(C6−C2)+out03 (if C6=C2, out03)
Calculation on the M axis:
Y'=(MX−M0)*(out20−out10)/(M2−M0)+out10 (if M2=M0, out10)
Development from the virtual CMY to the ink colors
The virtual CMY density data 130 obtained as mentioned above is developed into the ink colors. The 3-dimensional matrix table 24 is also used in the development. Ink color data 200 is calculated from the virtual CMY density data 130 which is inputted and the values of the ink color data which is outputted.
FIG. 5 shows an output media matrix table. That is, FIG. 5 shows a lookup table in which the representative values of the virtual CMY density data and the values of the ink color data corresponding to them have been stored. When the values of the virtual CMY density data 130 which is inputted coincide with the values on the table, it is sufficient to output in the ink colors corresponding to them. However, when they do not coincide with the values on the table, they are developed into the ink colors by predicting from the ink color data of the representative values at eight points surrounding the virtual CMY density data 130 which is inputted. The matrix table 24 has different values depending on a raw material (silk, nylon, polyester, etc.) which is outputted.

The development into the ink colors from the virtual CMY density data 130 will now be described in detail hereinbelow.

Figure 10:
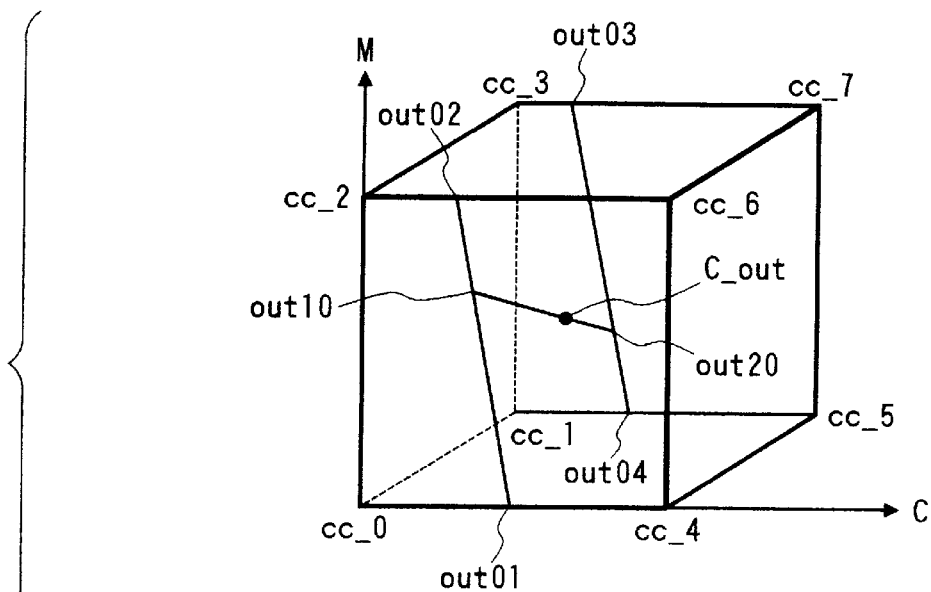
FIG. 10 is an explanatory diagram of an output media matrix table showing a cube to obtain C ink of ink color data and eight points near the inputted value.
Figure 11:
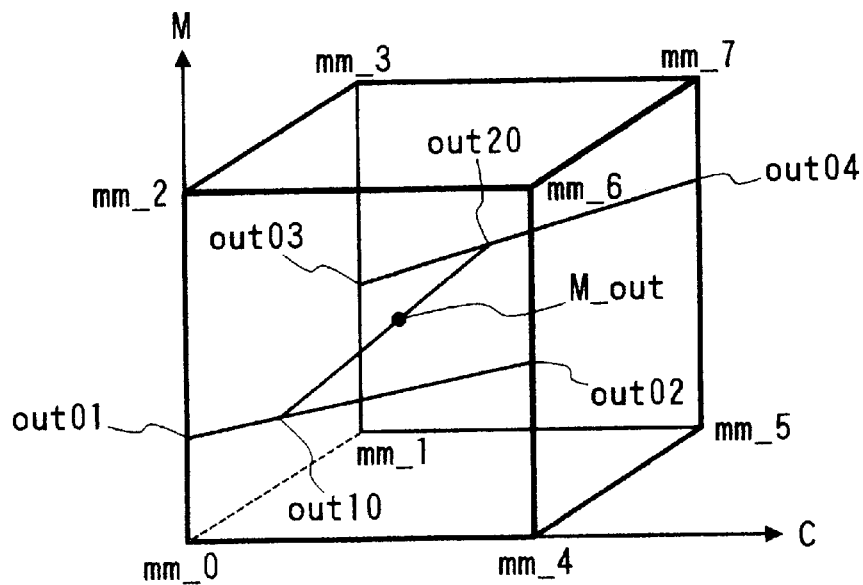
FIG. 11 is an explanatory diagram of a cube to obtain M ink of the ink color data.
Figure 12:
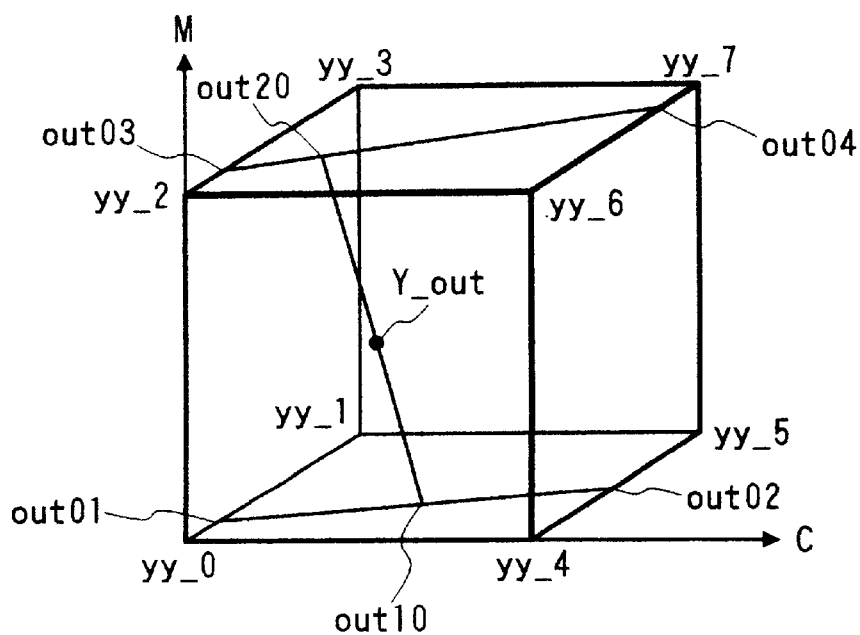
FIG. 12 is an explanatory diagram of a cube to obtain Y ink of the ink color data.
Figure 13:
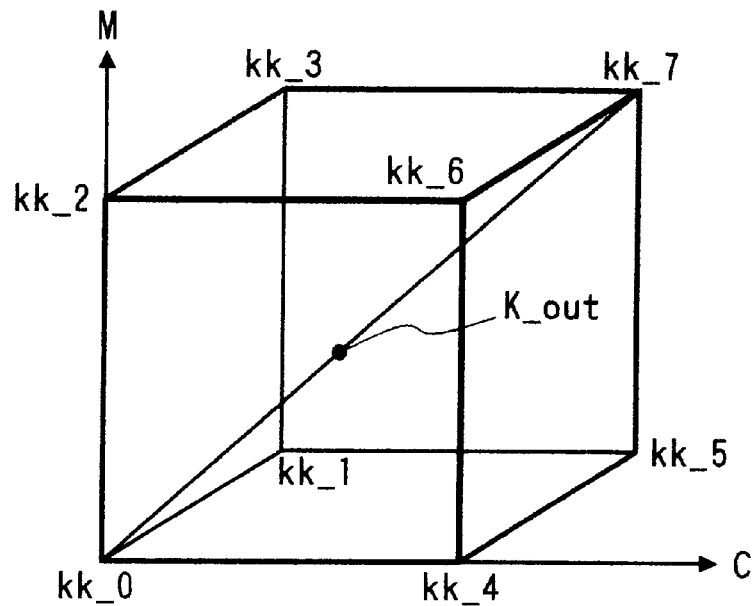
FIG. 13 is an explanatory diagram of a cube to obtain K ink of the ink color data.
Figure 14:
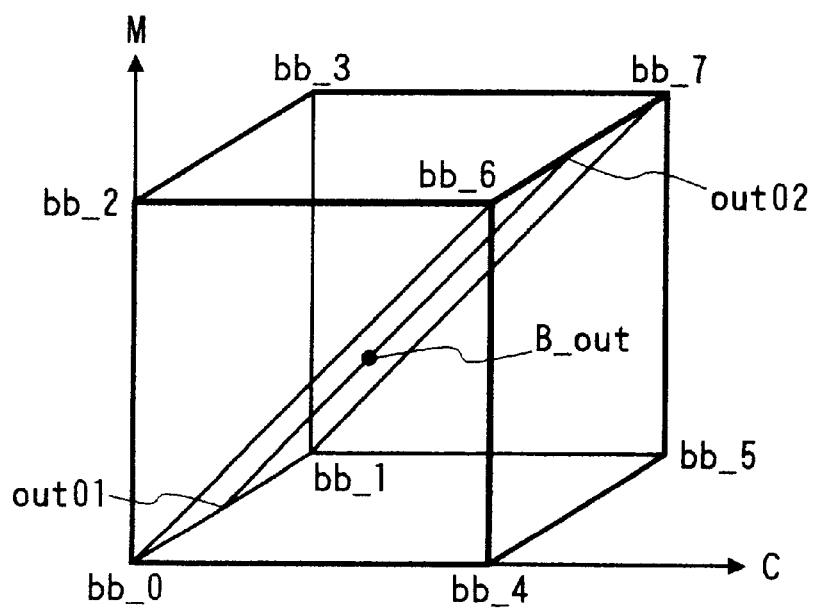
FIG. 14 is an explanatory diagram of a cube to obtain B ink of the ink color data.
Figure 15:
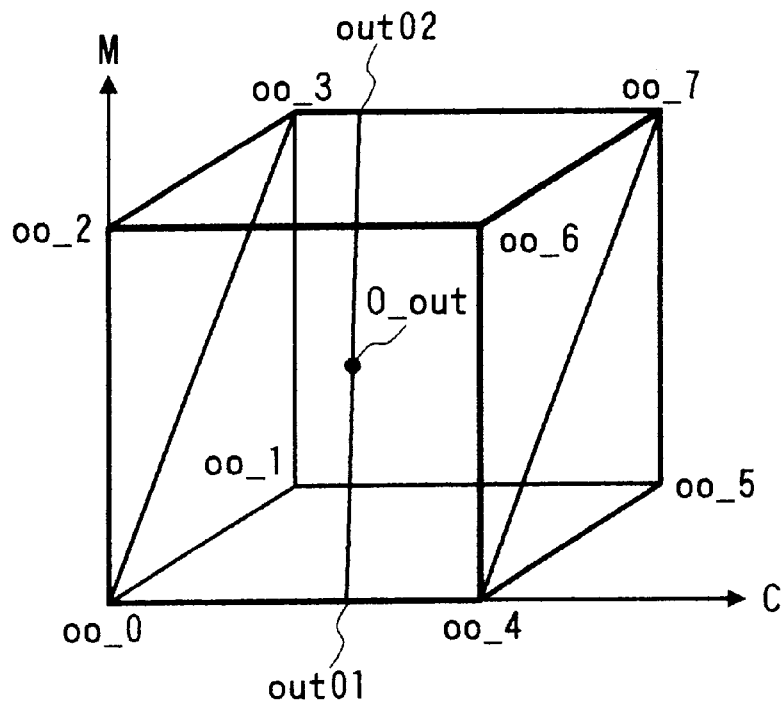
FIG. 15 is an explanatory diagram of a cube to obtain O ink of the ink color data.

Determination of the value of C ink color
On the basis of a presumption that the value of the C ink color has linear characteristics in the cube, the C ink color is calculated by linearly interpolating as shown in FIG. 10.
Calculations on the C axis:
out01=(C'−C'0)*(cc_4−cc_0)/(C'4−C'0)+cc_0 (if C'4=C'0, cc_0)
out02=(C'−C'2)*(cc_6−cc_2)/(C'6−C'2)+cc_2 (if C'6=C'2, cc_2)
out03=(C'−C'2)*(cc_7−cc_3)/(C'7−C'3)+cc_3 (if C'7=C'3, cc_3)
out04=(C'−C'1)*(cc_5−cc_1)/(C'5−C'1)+cc_1 (if C'5=C'1, cc_1)
Calculations on the M axis:
out10=(M'−M'0)*(out02−out01)/(M'2−M'0)+out01 (if M'2=M'0, out01)
out20=(M'−M'1)*(out04−out03)/(M'3−M'1)+out03 (if M'3=M'3, out03)
Calculation on the Y axis:
C_out=(Y'−Y'0)*(out20−out10)/(Y'1−Y'0)+out10 (if Y'1=Y'0, out01)
Determination of the value of M ink color
On the basis of a presumption that the value of the M ink color has linear characteristics in the cube, the M ink color is calculated by linearly interpolating as shown in FIG. 11.
Calculations on the M axis:
out01=(M'−M'0)*(mm_2−mm_0)/(M'2−M'0)+mm_0 (if M'2=M'0, mm_0)
out02=(M'−M'4)*(mm_6−mm_4)/(M'6−M'4)+mm_4 (if M'6=M'4, mm_4)
out03=(M'−M'1)*(mm_3−mm_1)/(M'3−M'1)+mm_1 (if M'3=M'1, mm_1)
out04=(M'−M'5)*(mm_7−mm_5)/(M'7−M'5)+mm_5 (if M'7=M'5, mm_5)
Calculations on the C axis:
out10=(C'−C'0)*(out02−out01)/(C'4−C'0)+out01 (if C'4=C'0, out01)
out20=(C'−C'1)*(out04−out03)/(C'5−C'1)+out03 (if C'5=C'1, out03)
Calculation on the Y axis:
Mount=(Y'−Y'0)*(out20−out10)/(Y'1−Y'0)+out10 (if Y'1=Y'0, out10)
Determination of the value of Y ink color
On the basis of a presumption that the value of the Y ink color has linear characteristics in the cube, the Y ink color is calculated by linearly interpolating as shown in FIG. 12.
Calculations on the Y axis:
out01=(Y'−Y'0)*(yy_1−yy_0)/(Y'1−Y'0)+yy_0 (if Y'1=Y'0, yy_0)
out02=(Y'−Y'4)*(yy_5−yy_4)/(Y'5−Y'4)+yy_4 (if Y'5=Y'4, yy_4)
out03=(Y'−Y'2)*(yy_3−yy_2)/(Y'3−Y'2)+yy_2 (if Y'3=Y'2, yy_2)

out04=(Y'-Y'6)*(yy_7-yy_6)/(Y'7-Y'6)+yy_6 (if Y'7= Y'6, yy_6)
Calculations on the C axis:
out10=(C'-C'0)*(out02-out01)/(C'4-C'0)+out01 (if C'4= C'0, out01)
out20=(C'-C'2)*(out04-out03)/(C'6-C'2)+out03 (if C'6= C'2, out03)
Calculation on the M axis:
Y_out=(M'-M'0)*(out20-out10)/(M'2-M'0)+out10 (if M'2=M'0, out10)
Determination of the value of K ink color
On the basis of a presumption that the value of the K ink color has linear characteristics in the cube, the K ink color is calculated by linearly interpolating as shown in FIG. 13.
KX=min(C', M', Y')
K0=min(C'0, M'0, Y'0)
K7=min(C'7, M'7, Y'7)
K_out=(KX-K0)*(kk_7-kk_0)/(K7-K0)+kk_0 (if K7=K0, kk_0)
Determination of the value of B ink color
On the basis of a presumption that the value of the B ink color has linear characteristics in the cube, the B ink color is calculated by linearly interpolating as shown in FIG. 14.
out01=(Y'-Y'0)*(bb_1-bb_0)/(Y'1-Y'0)+bb_0 (if Y'1= Y'0, bb_0)
out02=(Y'-Y'4)*(bb_7-bb_6)/(Y'7-Y'6)+bb_6 (if Y'7= Y'6, bb_6)
BX=Min(M', C')
B0=Min(M'0, C'0)
B6=Min(M'6, C'6)
B_out=(BX-B0)*(out02-out01)/(B6-B0)+out01 (if B6=B0, out01)
Determination of the value of O ink color
On the basis of a presumption that the value of the O ink color has linear characteristics in the cube, the O ink color is calculated by linearly interpolating as shown in FIG. 15.
out01=(C'-C'0)*(oo_4-oo_0)/(C'4-C'0)+oo_0 (if C'4= C'0, oo_0)
out02=(C'-C'3)*(oo_7-oo_3)/(C'7-C'3)+oo_3 (if C'7= C'3, oo_3)
OX=Min(M', Y')
O0=Min(M'0, Y'0)
O3=Min(M'3, Y'3)
O_out=(OX-O0)*(out02-out01)/(O3-O0)+out01 (if O3=O0, out01)
Finally, the calculated values are normalized to 0 to 255, respectively.

In the input media matrix table 23 and output media matrix table 24, the input image data is divided into upper bits and lower bits and the lattice point data corresponding to each apex of the cube to which the input image data belongs is obtained on the basis of the upper bits. The foregoing interpolating process is realized on the basis of the lower bits and the lattice point data.

As mentioned above, in case of obtaining the ink color data from C"M"Y" data by using the lookup table, when obtaining C, M, and Y, the linear interpolation is performed on the basis of eight lattice point data constructing the cubic. When obtaining the K color, the linear interpolation is performed between kk_0 indicative of an achromatic color on a CMY space to which the cubic belongs and kk_7. When obtaining B, the linear interpolation is executed by using bb_0, bb_1, bb_6, and bb_7 constructing a plane indicative of the B color on the CMY space to which the cubic belongs. When obtaining O, the linear interpolation is carried out by using oo_0, oo_3, oo_4, and oo_7 constructing a plane showing the O color in a manner similar to the case of obtaining B.

That is, the embodiment uses the interpolating method corresponding to the characteristics which the ink colors have, specifically speaking, the characteristics such that the K color is formed by isochromatically mixing the C, M, and Y colors, the B color is formed by isochromatically mixing the C and M colors, and the O color is formed by isochromatically mixing the M and Y colors.

As mentioned above, by using the method corresponding to the characteristics which the ink color has, a good color balance of each ink color data is obtained.

According to the embodiment described above, a color matching can be improved by using the 3-dimensional matrix table without using the masking process and gamma correction conversion. Further, the ink colors of CMYKBO can be calculated from the three factors of the virtual CMY data. By independently having the table of the input media and the table of the output raw materials, it is possible to develop into the ink color from the RGB data of various combinations. since only the table data is processed, a processing speed can be improved.

The invention can be made correspond to various output conditions by changing the output media matrix table in correspondence with the kind of ink or the number of inks.

Embodiment 2

Embodiment 2 is a modification of the embodiment 1 and is realized by adding an ink density fine adjusting function based on a manual instruction of the user to the system shown in FIG. 1.

Figure 16:
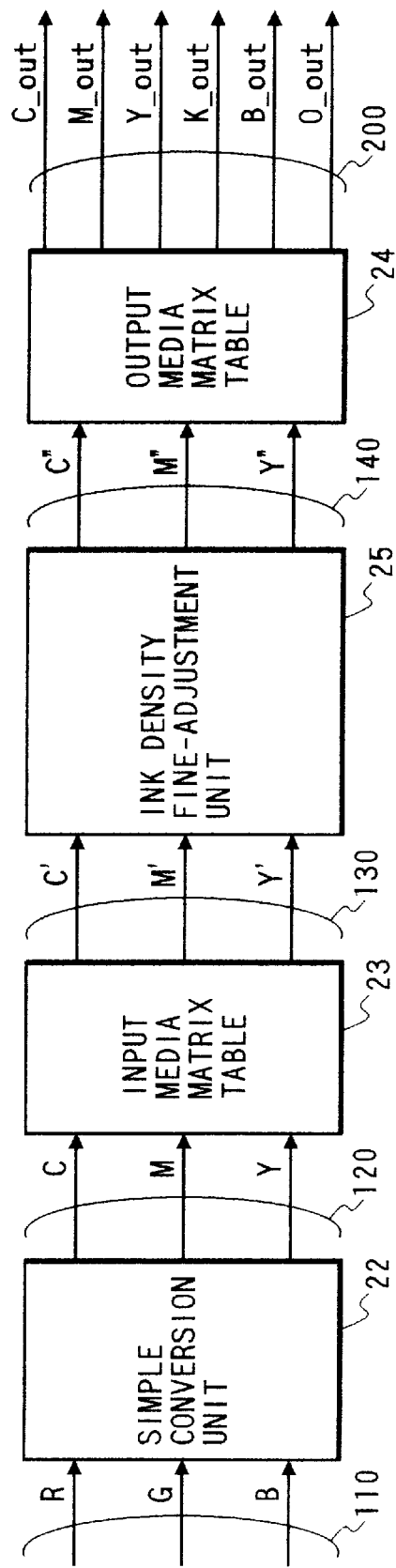
FIG. 16 is a block diagram of an image processing unit (RGB→ink color) of the invention.

FIG. 16 shows an internal structure of a portion for performing a process to develop the RGB data into the ink colors in the embodiment. Portions having the same constructions as those in the image processing system in the embodiment 1 shown in FIG. 3 are designated by the same reference numerals.

In the embodiment 2, a density adjustment based on a manual instruction of the user is performed by an ink density fine-adjustment unit 25 to the C'M'Y' data 130 converted by the input media matrix table 23. Converted C"M"Y" data 140 is converted into the C_out M_out Y_out K_out B_out O_out data 200 by the output media matrix table 24.

Processes regarding the adjustment of the ink density will now be described in detail hereinbelow.

Ink density fine-adjusting process

Values of the fine adjustment which are set by the user on a picture plane of FIG. 17 have a range of 50 in the plus direction and 50 in the minus direction, namely, a range from 50 to 150 by setting 100 with regard to the entire value of C, M, and Y and each of them to a reference.

Figure 18:
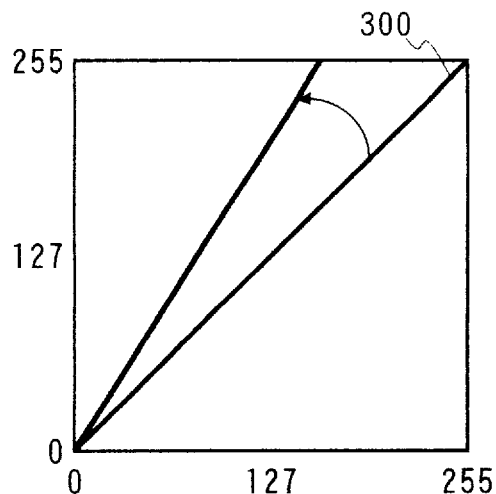
FIG. 18 is a diagram for explaining a change in each inclination when C, M, and Y in FIG. 7 is finely adjusted in the plus direction.

FIG. 18 is a graph showing a change in inclination of each density when the user increases numerical values of parameters of C, M, and Y.

Figure 19:
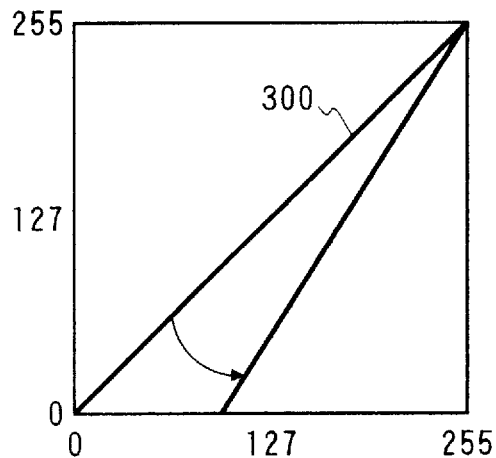
FIG. 19 is a diagram for a tone reproduction showing a change in each inclination when C, M, and Y in FIG. 7 is finely adjusted in the minus direction.

FIG. 19 is a graph showing a change in inclination of each density when the user decreases numerical values of parameters of C, M, and Y.

Figure 20:
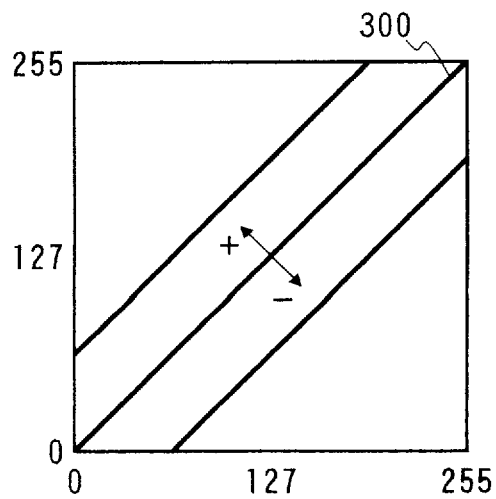
FIG. 20 is a diagram for a tone reproduction showing a change in inclination of each CMY data when the entire table in FIG. 7 is finely adjusted in the plus direction and minus direction.

FIG. 20 is a graph showing a change in inclination when the entire parameters are increased or decreased.

An inclination at 300 in FIGS. 18, 19, and 20 shows an inclination when the fine adjustment is not performed (a fine adjustment value is equal to 100).

FIG. 21 is a flow in case of performing the fine adjustment.

First, a check is made to see if the execution of the fine adjustment has been instructed by the user (step S101).

When it is instructed to execute the fine adjustment, a check is made to see if a value of param lies within a range from 0 or more to 50 or less (S102). A process is performed in accordance with a discrimination result.

"param" shows the fine adjustment value set by the user. "Input" shows the C'M'Y' data 130 which is inputted to the ink density fine-adjustment unit 25. "Output" denotes the C'M'Y' data after completion of the fine adjustment, namely, the C"M"Y" data 140.

When it is instructed to perform the fine adjustment for the C, M, and Y parameters, the following processes are executed for each of C, M, and Y.

(i) Process when $0 \leq param \leq 50$ (S103) Output=(Input*255)/(255−param)

(ii) Process when $-50 \leq param \leq 0$ (S104) Output=255*(Input+param)/(255+param)

Subsequently, a check is made to see if the execution of the fine adjustment for the entire parameters has been instructed (S105).

When it is instructed to perform the fine adjustment for the entire parameters, the following process is executed to all of C, M, and Y (S106).

Output=Input+param

The C"M"Y" data 140 is calculated by the above procedure.

As mentioned above, when the RGB data is converted into the ink color data, the user can output at a desired density. The adjustment can be also performed by only the fine adjustment of CMY in spite of a fact that the specific colors (blue, orange) are treated.

According to the embodiment as mentioned above, the user can finely adjust the ink density by only the fine adjustment of CMY.

It is also possible to form a 1-dimensional lookup table for each color component of C'M'Y' on the basis of the above arithmetic operating equations.

The above embodiment can be applied to a system constructed of a plurality of equipment (for instance, host computer, interface equipment, printer, reader, and the like) or can be also applied to an apparatus (for example, copying apparatus or the like) comprising one equipment.

Processes similar to those of the embodiments can be also realized by a method whereby a storage medium in which a program of software to accomplish the above embodiments has been stored is supplied to a system or an apparatus, the system or apparatus reads out the program stored in the storage medium, and the CPU (not shown) executes the program.

As a storage medium to supply the program, for example, it is possible to use a floppy disk, a hard disk, an optical disk, a magnetooptic disk, a CD-ROM, a CD-R, a magnetic tape, a non-volatile memory card, an ROM, or the like.

The present invention is not limited to the foregoing embodiments but many modifications and variations are possible within the spirit and scope of the appended claims of the invention.

What is claimed is:

1. An image processing system for performing a color converting process by using a table for converting input color image data, the input color image data not including color components corresponding to specific colors, to output image data corresponding to a plurality of recording materials, the output image data comprising components of colors including said specific colors, the system comprising:

input means for inputting color image data which does not include components of said specific colors; and interpolating process means for using plural table output image data obtained from the table on the basis of the input color image data to generate the output image data corresponding to the plurality of recording materials, the output image data comprising components of colors including said specific colors, wherein said interpolating process means generates the output image data based on characteristics of said specific colors relating to component colors other than said specific colors.

2. A system according to claim 1, wherein said interpolating process means generates the output image data using data of lattice points existing on an achromatic axis in an interpolation solid corresponding to said input color image data, with regard to black color components.

3. A system according to claim 1, wherein said interpolating process means generates the output image data using data of lattice points existing on a plane corresponding to said specific colors in an interpolation solid corresponding to said input color image data, with regard to specific color components.

4. A system according to claim 1, further comprising image forming means for forming an image onto a woven fabric on the basis of said ouput image data.

5. A system according to claim 4, further comprising storing means for storing a plurality of tables in correspondence with kinds of woven fabrics.

6. A system according to claim 4, further comprising storing means for storing a plurality of tables in correspondence with kinds of said recording materials.

7. An image processing method for performing a color converting process by using a table for converting input color image data, the input color image data not including color components corresponding to specific colors, to output image data corresponding to a plurality of recording materials, the output image data comprising components of colors including said specific colors, comprising the steps of:

inputting color image data which does not include components of said specific colors; and an interpolating process step for using plural table output image data obtained from the table on the basis of the input color image data to generate the output image data corresponding to the plurality of recording materials, the output image data comprising components of colors including said specific colors, wherein said interpolating process step generates the output image data based on characteristics of said specific colors relating to component colors other than said specific colors.

8. A system according to claim 1, further comprising color correcting means for color-correcting the input color image data which does not include color components of said specific colors, wherein said color-corrected color image data is represent by real numbers.

9. A recording media on which a program to realize an image processing method has been stored, said method for performing a color converting process by using a table for converting input color image data, the input color image data not including color components corresponding to specific colors, to output image data corresponding to a plurality of recording materials, the output image data comprising components of colors including said specific colors, comprising the steps of:

inputting color image data which does not include components of said specific colors; and an interpolating process step for using plural table output image data obtained from the table on the basis of the input color image data to generate the output image data corresponding to the plurality of recording materials, the output image data comprising components of colors including said specific colors, wherein said interpolating process step generates the output image data based on characteristics of said specific colors relating to component colors other than said specific colors.

* * * * *

UNITED STATES PATENT AND TRADEMARK OFFICE
CERTIFICATE OF CORRECTION

PATENT NO. : 6,038,373
DATED : March 14, 2000
INVENTOR(S) : Hisashi Matsumoto et al.

It is certified that error appears in the above-identified patent and that said Letters Patent is hereby corrected as shown below:

Title page:
Under Foreign Patent Documents, "7193723" should read -- 7-193723 --, and "9051421" should read -- 9-051421 --.

Abstract:
Lines 3 and 8, "colors'" should read -- colors, --.

Column 2:
Line 13, "he" should read -- they --.

Column 3:
Line 21, "in" should read -- by --.

Column 8:
Line 21, "correspond" should read -- to correspond --.

Column 9:
Line 58, "components corresponding to" should read -- components of --;
Line 59, "a plurality of" should read -- a --; and
Line 60, "materials," should read -- material, --.

Column 10:
Line 1, "the plurality of" should read -- the --;
Line 2, "materials," should read -- material, --;
Line 5, "of" should read -- of color components of --;
Line 6, "colors relating to component colors other than" should read -- colors. --;
Line 7, "said specific colors." should be deleted;
Line 27, "materials." should read -- material. --;
Line 31, "components corresponding to" should read -- components of --;
Line 32, "a plurality of" should read -- a --;
Line 33, "materials." should read -- material. --;
Line 42, "the plurality of" should read -- the --;
Line 43, "materials." should read -- material. --;
Line 46, "of" should read -- of color components of --;
Line 47, "colors relating to component colors other than" should read -- colors. --;
Line 48, "said specific colors." should be deleted;
Line 54, "represent" should read -- represented --;
Line 60, "components corresponding to" should read -- components of --;
Line 61, "a plurality of" should read -- a --; and
Line 62, "materials," should read -- material, --.

UNITED STATES PATENT AND TRADEMARK OFFICE
CERTIFICATE OF CORRECTION

PATENT NO. : 6,038,373
DATED : March 14, 2000
INVENTOR(S) : Hisashi Matsumoto et al.

It is certified that error appears in the above-identified patent and that said Letters Patent is hereby corrected as shown below:

Column 11:
Line 4, "the plurality of" should read -- the --; and
Line 5, "materials," should read -- material, --.

Column 12:
Line 2, "of" should read -- of color components of --;
Line 3, "colors relating to component colors other than" should read -- colors. --; and
Line 4, "said specific colors." should be deleted.

Signed and Sealed this

Ninth Day of October, 2001

Attest:

NICHOLAS P. GODICI
Attesting Officer
Acting Director of the United States Patent and Trademark Office

UNITED STATES PATENT AND TRADEMARK OFFICE
CERTIFICATE OF CORRECTION

PATENT NO.   : 6,038,373
DATED         : March 14, 2000
INVENTOR(S)  : Hisashi Matsumoto et al.

It is certified that error appears in the above-identified patent and that said Letters Patent is hereby corrected as shown below:

Title page,
FOREIGN PATENT DOCUMENTS, "7193723" should read -- 7-193723 --, "9051421" should read -- 9-051421 --.

ABSTRACT,
Lines 3 and 8, "colors' " should read -- colors, --.

Column 2,
Line 13, "he" should read -- they --.

Column 3
Line 21, "in" should read -- by --.

Column 8,
Line 21, "correspond" should read -- to correspond --.

Column 9,
Line 58, "components corresponding to" should read -- components of --;
Line 59, "a plurality of" should read -- a --; and
Line 60, "materials," should read -- material, --.

Column 10,
Line 1, "the plurality of" should read -- the --;
Line 2, "materials," should read -- material, --;
Line 5, "of" should read -- of color components of --;
Line 6, "colors relating to component colors other than" should read -- colors. --;
Line 7, "said specific colors." should be deleted;
Line 27, "materials." should read -- material. --;
Line 31, "components corresponding to" should read -- components of --;
Line 32, "a plurality of" should read -- a --;
Line 33, "materials." should read -- material. --;
Line 42, "the plurality of" should read -- the --;
Line 43, "materials." should read -- material. --;
Line 46, "of" should read -- of color components of --;
Line 47, "colors relating to component colors other than" should read -- colors. --;
Line 48, "said specific colors." should be deleted;
Line 54, "represent" should read -- represented --;
Line 60, "components corresponding to" should read -- components of --;
Line 61, "a plurality of" should read -- a --; and
Line 62, "materials," should read -- material, --.

UNITED STATES PATENT AND TRADEMARK OFFICE
CERTIFICATE OF CORRECTION

PATENT NO. : 6,038,373
DATED : March 14, 2000
INVENTOR(S) : Hisashi Matsumoto et al.

It is certified that error appears in the above-identified patent and that said Letters Patent is hereby corrected as shown below:

Column 11,
Line 4, "the plurality of" should read -- the --; and
Line 5, "materials," should read -- material, --.

Column 12,
Line 2, "of" should read -- of color components of --;
Line 3, "colors relating to component colors other than" should read -- colors. --; and
Line 4, "said specific colors." should be deleted.

Signed and Sealed this

Fourth Day of December, 2001

Attest:

*Nicholas P. Godici*

NICHOLAS P. GODICI
*Attesting Officer*   *Acting Director of the United States Patent and Trademark Office*